Jesse Jenkins Wagon.

No. 121,378.

Patented Nov. 28, 1871.

Witnesses.
A. A. Yeatman
C. L. Evert

Inventor.
Jesse Jenkins
per Alexander Mason
Attys.

UNITED STATES PATENT OFFICE.

JESSE JENKINS, OF SLIGO, MARYLAND, ASSIGNOR OF ONE-THIRD OF HIS RIGHT TO ABNER C. P. SHOEMAKER, OF BRIGHTWOOD, DISTRICT OF COLUMBIA.

IMPROVEMENT IN WAGONS.

Specification forming part of Letters Patent No. 121,378, dated November 28, 1871; antedated November 18, 1871.

*To all whom it may concern:*

Be it known that I, JESSE JENKINS, of Sligo, in the county of Montgomery and in the State of Maryland, have invented certain new and useful Improvements in Wagons; and do hereby declare that the following is a full, clear, and exact description thereof, reference being had to the accompanying drawing and to the letters of reference marked thereon making a part of this specification.

The nature of my invention consists in the combination and arrangement of the support for the body of a vehicle, as will be hereinafter fully set forth.

In order to enable others skilled in the art to which my invention appertains to make and use the same, I will now proceed to describe its construction and operation, referring to the annexed drawing, in which—

Figure 1:
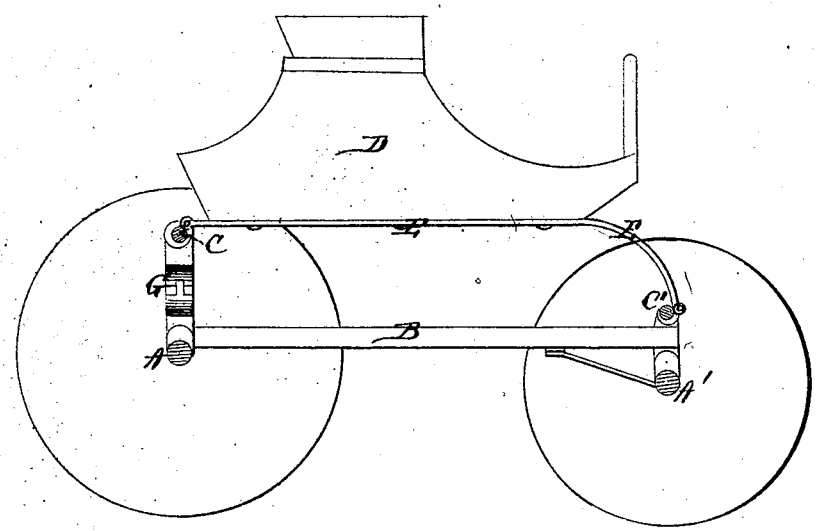
Figure 2:
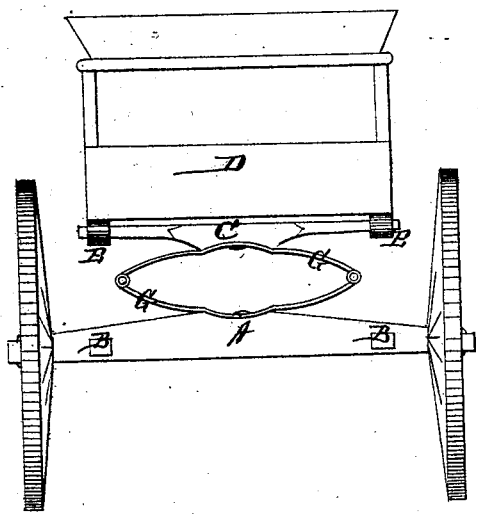

Figure 1 is a side elevation of the wagon, the wheels on one side being removed, and Fig. 2 is a rear view of the same.

A represents the rear axle, and B B the perches attached to the same. The front ends of the perches B B are attached to the head-block C', which also forms the front hound, pivoted to the front axle A' by the usual king-bolt. D represents the wagon-body, on the under side of which, at or near each side, runs a metal bar, E. The front ends of the two bars E E are curved downward, as shown in Fig. 1, and form eyes or loops, which are slipped over the ends of the front hound C', or they may be hinged to the front hound, as shown in Fig. 1. The rear ends of the said bars E E also form eyes or loops, which are slipped over the ends of the rear hound C, and this hound is supported upon one or more elliptic or other springs, G, attached to the rear axle A. By this arrangement of the support for the body D it will be seen that the body cannot sag forward or backward, as is generally the case when passing over gullies or other similar places.

Having thus fully described my invention, what I claim as new, and desire to secure by Letters Patent, is—

The within-described vehicle, consisting of the box D, springs E E attached under the box, and provided with loops at each end, which encircle the front and rear hounds C C' rear spring G and axle A A', connected by the perches B B, all substantially as set forth.

In testimony that I claim the foregoing I have hereunto set my hand this 21st day of November, 1870.

JESSE JENKINS.

Witnesses:
A. N. MARR,
JAS. E. HUTCHINSON.

(31)